United States Patent
Bohra et al.

(10) Patent No.: US 9,865,001 B2
(45) Date of Patent: Jan. 9, 2018

(54) DETERMINING INCENTIVE FOR CROWD SOURCED QUESTION

(71) Applicant: International Business Machines Corporation, Armonk, NY (US)

(72) Inventors: Amit P. Bohra, Maharashtra (IN); Krishna Kummamuru, Bangalore (IN); Abhishek Shivkumar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/738,100

(22) Filed: Jun. 12, 2015

(65) Prior Publication Data

US 2016/0162922 A1 Jun. 9, 2016

Related U.S. Application Data

(63) Continuation of application No. 14/558,905, filed on Dec. 3, 2014.

(51) Int. Cl.
| | | |
|---|---|---|
| *G06Q 30/00* | (2012.01) | |
| *G06Q 30/02* | (2012.01) | |
| *G06Q 50/00* | (2012.01) | |
| *G09B 7/02* | (2006.01) | |
| *G09B 19/00* | (2006.01) | |
| *G06Q 10/10* | (2012.01) | |

(52) U.S. Cl.
CPC ....... *G06Q 30/0208* (2013.01); *G06Q 10/101* (2013.01); *G06Q 50/01* (2013.01); *G09B 7/02* (2013.01); *G09B 19/00* (2013.01)

(58) Field of Classification Search
CPC .................. G06Q 30/0208; G06Q 10/101
USPC ...................................... 705/14.11
See application file for complete search history.

(56) References Cited

U.S. PATENT DOCUMENTS

| | | |
|---|---|---|
| 7,209,876 B2 | 4/2007 | Miller et al. |
| 8,275,803 B2 | 9/2012 | Brown et al. |
| 8,346,701 B2 | 1/2013 | Wang et al. |

(Continued)

FOREIGN PATENT DOCUMENTS

JP   2006012179 A  *  1/2006  ............. G06F 17/28

OTHER PUBLICATIONS

Prakash et al. Natural language processing: an introduction. Retrieved online May 10, 2017. J Am Med Inform Assoc. Sep.-Oct. 2011; https://www.ncbi.nlm.nih.gov/pmc/articles/PMC3168328/.*

(Continued)

*Primary Examiner* — James A Reagan
(74) *Attorney, Agent, or Firm* — Michael O'Keefe

(57) ABSTRACT

A computing device receives one or more questions. The computing device determines at least one of an urgency factor, an importance factor, and a difficulty level associated with the received one or more questions and determines at least one of an availability factor, a skill factor, and a quality level associated with the received one or more questions. The computing device determines an incentive based on the determined at least one of an urgency factor, an importance factor, and a difficulty level associated with the received one or more questions, and the determined at least one of an availability factor, a skill factor, and a quality level associated with the received one or more questions.

7 Claims, 3 Drawing Sheets

(56) References Cited

U.S. PATENT DOCUMENTS

| | | | |
|---|---|---|---|
| 2002/0188777 A1* | 12/2002 | Kraft | G06Q 10/10 710/100 |
| 2005/0075919 A1* | 4/2005 | Kim | G06Q 10/06316 705/7.26 |
| 2008/0120129 A1* | 5/2008 | Seubert | G06Q 10/06 705/35 |
| 2010/0293026 A1 | 11/2010 | Vojnovic et al. | |
| 2011/0106829 A1* | 5/2011 | Pradhan | G06F 17/30699 707/765 |
| 2011/0229864 A1* | 9/2011 | Short | G09B 7/00 434/219 |
| 2011/0231226 A1* | 9/2011 | Golden | G06Q 20/10 705/7.32 |
| 2012/0088220 A1 | 4/2012 | Feng et al. | |
| 2012/0265573 A1 | 10/2012 | Van Pelt et al. | |
| 2012/0265574 A1 | 10/2012 | Olding et al. | |
| 2013/0017524 A1 | 1/2013 | Barborak et al. | |
| 2013/0066693 A1 | 3/2013 | Laird-McConnell et al. | |
| 2013/0097178 A1 | 4/2013 | Song et al. | |
| 2013/0204652 A1 | 8/2013 | Marins et al. | |
| 2014/0280540 A1 | 9/2014 | Wurtele et al. | |

OTHER PUBLICATIONS

Hsieh et al., "Why Pay?: Exploring How Financial Incentives are Used for Question & Answer", CHI 2010, Apr. 10-15, 2010, Atlanta, Georgia, USA, ACM 978-1-60558-929-9/10/04, 10 pages.

Jain et al, "Designing Incentives for Online Question and Answer Forums", EC'09, Jul. 6-10, 2009, Stanford, California, USA, ACM 978-1-60558-458-4/09/07, 10 pages.

Disclosed Anonymously, "Incentive system and method for an intranet based Question and Answer forum.", ip.com, IP.com No. IPCOM000199048D, Ip.com Electronic Publication: Aug. 24, 2010, 3 pages.

Aritajati, "Green Dolphin: an Educational Questions and Answers Website", Graduate Faculty of Auburn University, Auburn, Alabama, Aug. 3, 2013, 122 pages.

Quora, www.quora.com, accessed on Jul. 22, 2014, 1 pg.

Yahoo Answers, http://in.answers.yahoo.com, accessed on Jul. 22, 2014, 2 pgs.

Watson System, http://researcher.watson.ibm.com/researcher/view_group.php?id=2099, accessed on Jul. 22, 2014, 1 pg.

"Cognos: Crowdsourcing Search for Topic Experts in Microblogs", http://www.facweb.iitkgp.ernet.in/~niloy/PAPER/SIGIR2012.pdf, 10 pages.

Abrahamson, "The rise of reputation systems: finding on-demand experts in today's work world", Jul. 24, 2013, http://research.gigaom.com/report/the-rise-of-reputation-systems-finding-on-demand-experts-in-todays-work-world/, accessed on Jul. 22, 2014, 4 pgs.

Bohra, et al., "Determining Incentive for Crowd Sourced Question," U.S. Appl. No. 14/558,905, filed Dec. 3, 2014.

IBM, "List of IBM Patents or Patent Applications Treated as Related."

Pulla et al., "Questcrowd: a location-based question answering system with participation incentives", INFOCOM'2013 Demo/Poster Session, 2013 IEEE, pp. 75-76.

* cited by examiner

US 9,865,001 B2

DETERMINING INCENTIVE FOR CROWD SOURCED QUESTION

TECHNICAL FIELD

The present invention relates generally to crowd sourcing, and more particularly to determining an incentive for a question-answering task in a crowd sourcing setting.

BACKGROUND

Crowd sourcing is a very popular way to get answers to questions. For example, social media or online forums are widely used to ask and retrieve answers to questions. By utilizing crowd sourcing to answer questions, one can retrieve the best answer in the most efficient manner. In some settings, answers to important questions can be valuable and therefore a compensation of sorts may be required to obtain the answer.

SUMMARY

Embodiments of the present invention provide a system, method, and program product for receiving one or more questions; determining at least one of an urgency factor, an importance factor, and a difficulty level associated with the received one or more questions; determining at least one of an availability factor, a skill factor, and a quality level associated with the received one or more questions; and determining an incentive based on the determined at least one of an urgency factor, an importance factor, and a difficulty level associated with the received one or more questions, and the determined at least one of an availability factor, a skill factor, and a quality level associated with the received one or more questions.

DETAILED DESCRIPTION

Embodiments of the present invention will now be described in detail with reference to the accompanying Figures.

Figure 1:
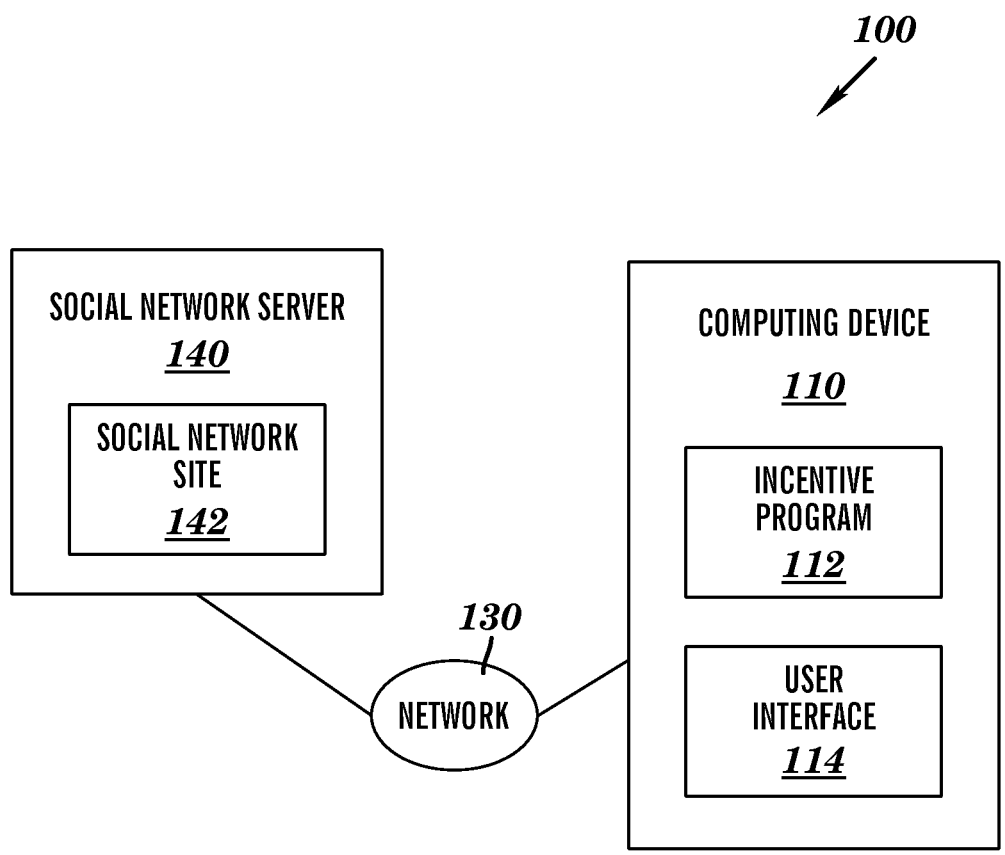
FIG. 1 illustrates an incentive determination system, in accordance with an embodiment of the invention.

FIG. 1 illustrates workflow creation system 100, in accordance with an embodiment of the invention. In an example embodiment, workflow creation system 100 includes computing device 110 and social network server 140 all interconnected via network 130.

In the example embodiment, network 130 is the Internet, representing a worldwide collection of networks and gateways to support communications between devices connected to the Internet. Network 130 may include, for example, wired, wireless, or fiber optic connections. In other embodiments, network 130 may be implemented as an intranet, a local area network (LAN), or a wide area network (WAN). In general, network 130 can be any combination of connections and protocols that will support communications between computing device 110 and social network server 140.

Social network server 140 includes social network site 142. Social media server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, social network server 140 can comprise a cluster of web servers executing the same software to collectively process the requests for the web pages as distributed by a front end server and a load balancer. In the example embodiment, social network server 140 is a computing device that is optimized for the support of websites which reside on social network server 140, such as social network site 142, and for the support of network requests related to websites, which reside on social network server 140. Social network server 140 is described in more detail with reference to FIG. 3.

Social network site 142 is a collection of files including, for example, HTML files, CSS files, image files and JavaScript files. Social network site 142 can also include other resources such as audio files and video files.

Computing device 110 includes incentive program 112 and user interface 114. Computing device 110 may be a desktop computer, a notebook, a laptop computer, a tablet computer, a handheld device, a smart-phone, a thin client, or any other electronic device or computing system capable of receiving and sending data to and from other computing devices, such as social network server 140, via network 130. Although not shown, optionally, computing device 110 can comprise a cluster of devices executing the same software to collectively process requests. Computing device 110 is described in more detail with reference to FIG. 3.

User interface 114 includes components used to receive input from a user and transmit the input to an application residing on computing device 110. In the example embodiment, user interface 114 uses a combination of technologies and devices, such as device drivers, to provide a platform to enable users of computing device 110 to interact with incentive program 112. In the example embodiment, user interface 114 receives input, such as textual input received from a physical input device, such as a keyboard, via a device driver that corresponds to the physical input device.

Incentive program 112 is software capable of receiving information, such as user input describing a question and the importance and urgency of the question. In addition, in the example embodiment, incentive program 112 is capable of determining factors related to the question such as the difficulty level, the life of the question, the recency of the question, a group of experts for the question, the skill level and availability of the group of experts, and the quality level previous similarly answered questions. Further, incentive program 112 is capable of determining an incentive based on one or more of the aforementioned factors and other factors related to the question. In the example embodiment, an incentive is a payment, reward, increased user rating, or other type of compensation that can be awarded to a user/expert for answering a question. The operations and functions of incentive program 112 is described in more detail with reference to FIG. 3.

Figure 2:
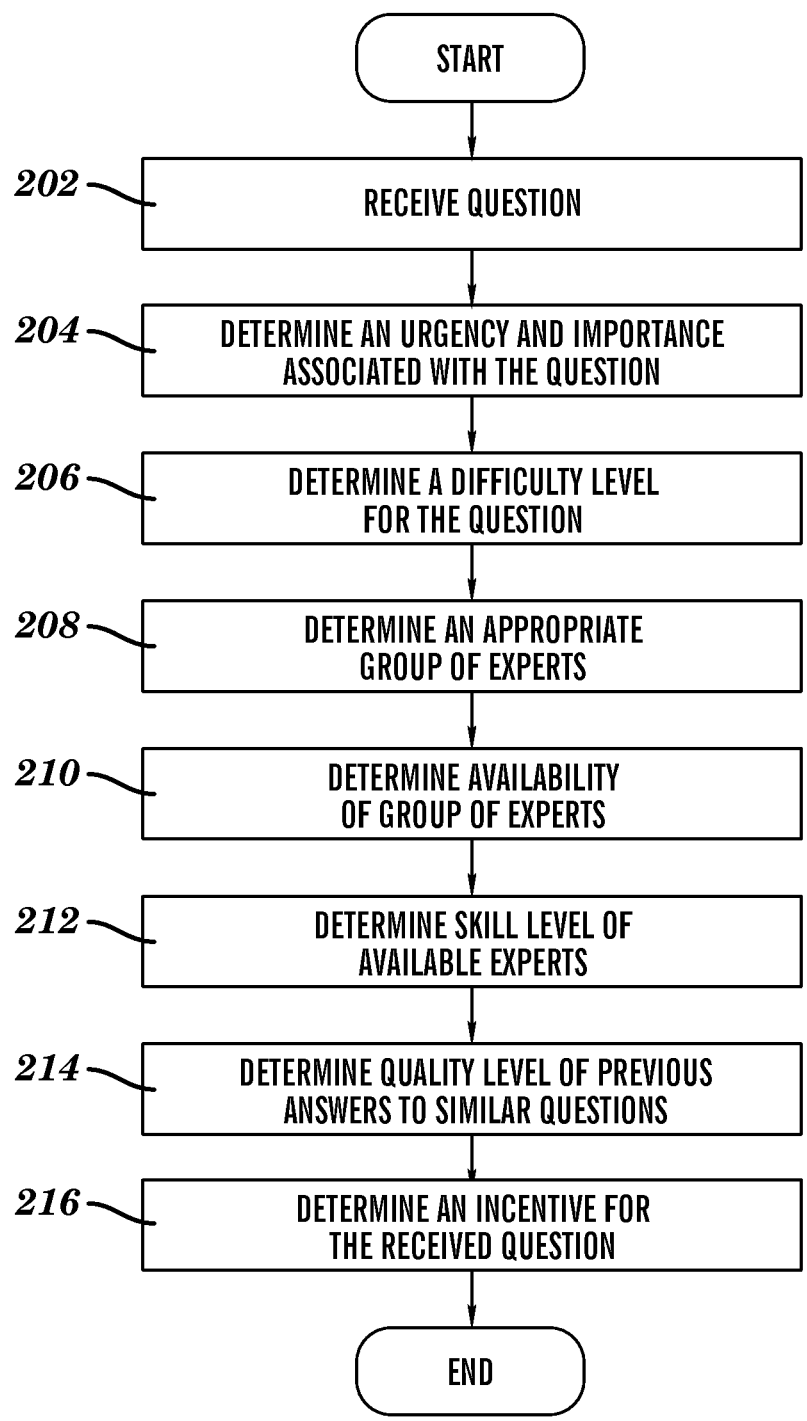
FIG. 2 is a flowchart illustrating the operations of the incentive program of FIG. 1 in determining an incentive for a received question, in accordance with an embodiment of the invention.

FIG. 2 is a flowchart illustrating the operations of incentive program 112 in determining an incentive for a received question, in accordance with an example embodiment of the invention. In the example embodiment, an incentive is a payment (monetary or good/item), increased user rating, increased peer rating/popularity score, or other form of score/rating that may be associated with an expert. In other embodiments, an incentive may be another form of positive reinforcement.

In the example embodiment, incentive program 112 detects that a question (or questions) has been received by question program 116 from the user of computing device 110 via user interface 114 (step 202). For example, incentive program 112 may receive a question such as "What type of metal should I use in order to make a cost-effective semiconductor device?". In other embodiments, incentive program 112 receives the question from another computing device via network 130.

Incentive program 112 determines an urgency factor and an importance factor associated with the received question (step 204). In the example embodiment, incentive program 112 determines an urgency factor and an importance factor for the question based on user input received from the user of computing device 110 via user interface 114. For example, when the user of computing device 110 submits the question, incentive program 112 may provide an option to submit a numerical urgency rating. In the example embodiment, the higher the numerical urgency rating, the more urgent the question, however, in other embodiments, a different rating system may be used. In the same manner, when the user of computing device 110 submits the question, incentive program 112 may provide an option to submit a numerical importance rating. In the example embodiment, the higher the numerical importance rating, the more important the question, however, in other embodiments, a different rating system may be used.

Incentive program 112 determines a difficulty level (difficulty factor) to associate with the received question (step 206). In the example embodiment, incentive program 112 determines a difficulty level to associate with the received question by utilizing natural language processing to determine at least one of the topics present within the question, the number of nouns present within the question, and determine the parse tree of the question. In the example embodiment, incentive program 112 may utilize the topics present within the question and then cross-reference the topics with a database which contains a list of topics and associated difficulty levels. If incentive program 112 finds more than one topic, incentive program 112 may cross-reference the database to determine the difficulty levels associated with the multiple topics and then average the determined difficulty levels. In addition, based on the number of nouns present in the question, incentive program 112 may assign an appropriate difficulty level (the more nouns, the higher the difficulty level). In other embodiments, incentive program 112 may cross-reference the determined topics with reference material (such as online reference material) to determine the number of entries present for the determined topics. In this embodiment, the more entries that are located, the higher the difficulty level, however, in other embodiments, a different correlation may be used. In further embodiments, the incentive program 112 may receive the difficulty level from the user of computing device 110 as a user input via user interface 114. In even further embodiments, incentive program 112 may utilize natural language processing to compare the received question to previously received questions and assign a similar difficulty level to the received question.

Incentive program 112 determines an appropriate group of experts for the received question (step 208). In the example embodiment, incentive program 112 references social network site 142 via network 130 in order to determine an appropriate group of experts for the question. For example, incentive program 112 may base the determination on the skills, messages posted, endorsements, or other relevant information on the social network page of each expert. In addition, professional network sites, employer databases and webpages, and previously answered questions may also be utilized in order to determine whether a person may be considered an expert with regard to the received question. In other embodiments, incentive program 112 may determine that the social network of the user of computing device 110 is an appropriate group for the received question.

Incentive program 112 determines the availability within the group of experts (step 210). In the example embodiment, incentive program 112 determines the availability within the group of experts by checking the activity level of each expert, how frequently each expert logs on, questions asked in the past, seasonality of the expert's login schedule, and how often the expert answers questions. In addition, each expert may provide an indication whether he or she is available. In the example embodiment, incentive program 112, incentive program 112 may communicate with sister programs via network 130 to determine the availability of an expert. For example, when incentive program 112 is initiated, incentive program 112 may display and indicator, such as "available" or a green dot, to indicate that the user of computing 110 is available. In the same manner, sister programs of incentive program 112 may provide a similar indication. Therefore, incentive program 112 may communicate with sister programs, via network 130, in order to determine whether another user (potential expert) is available. Furthermore, as stated above, incentive program 112 (and sister programs) may track relevant user information such as: the activity level of a user, how frequently a user logs on, questions asked in the past, seasonality of the user's login schedule, and how often the user answers questions. Incentive program 112 may also communicate with sister programs, via network 130, in order to retrieve the relevant user information and determine an availability of a user (potential expert) based on the retrieved information. In the example embodiment, incentive program 112 determines an availability factor based on the determined availability within the group of experts. In the example embodiment, the higher the availability, the lower the availability factor (and vice versa), however, in other embodiments, a different correlation may be used.

Incentive program 112 determines the skill level of the available experts (step 212). In the example embodiment, incentive program 112 may determine the skill level of available experts by examining a profile maintained by incentive program 112 (and sister programs), analyzing past questions answered by available experts (retrieved via network 130), or analyzing professional or social network profiles of available experts by communicating with social network server 140 via network 130. In the example embodiment, incentive program 112 utilizes profile and other retrieved information to determine whether the skill level of each available experts is above a specific threshold. If incentive program 112 determines that the skill level of an expert is above a specific threshold, the expert is designated as "skilled". Incentive program 112 then determines a skill level (skill factor) of the available experts based on the number of experts designated as "skilled". In other embodiments, incentive program 112 may determine the skill level based on the percentage of experts designated as "skilled".

Incentive program 112 determines the quality level (quality factor) of answers to previous similar questions (step 214). In the example embodiment, for previously answered questions, incentive program 112 may provide an option to each user to rate each answer received. Incentive program 112 may then store the answer in association with the corresponding rating. Therefore, incentive program 112 may then compare the received question (current) with previously answered similar questions in order to determine a quality level. In the example embodiment, the lower the ratings associated with previously answered questions, the lower the quality level, however, in other embodiments, a different correlation may be used. In other embodiments, the ratings associated with previously answered questions may be compared to one or more threshold levels to determine a corresponding quality level.

Furthermore, in the example embodiment, incentive program 112 may determine the life of the received question in the system (recency level/factor). In the example embodiment, the longer the question has remained in the system without being answered, the more the incentive is reduced. In the example embodiment, incentive program 112 may have threshold levels (representing lengths of time) which, when surpassed, reduce the incentive by a pre-determined amount. In other embodiments, if a question is marked as important (has a high importance level/factor), the incentive may not be reduced, or may only be slightly reduced, as the question ages in the system.

Incentive program 112 determines an incentive for the received question (step 216). In the example embodiment, incentive program 112 determines an incentive for the received question based on the urgency factor, the importance factor, the difficulty factor, the availability factor, the skill factor, and the quality factor. For example, incentive program 112 may determine the incentive for the received question by utilizing the equation below:

$$Z = AT + BU + CV + DW + EX + FY$$

Where Z is the incentive, T is the urgency factor, A is a weight associated with the urgency factor, U is the importance factor, B is a weight associated with the importance factor, V is the difficulty factor, C is a weight associated with the difficulty factor, W is the availability factor, D is a weight associated with the availability factor, X is the skill factor, E is a weight associated with the skill factor, Y is the quality factor, and F is a weight associated with the quality factor.

In the example embodiment, the weights associated with each factor are determined by machine learning. In other embodiments, the weights associated with each factor may be input by a programmer or user.

In other embodiments, other relevant factors may be included in the determination of the incentive.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 3:
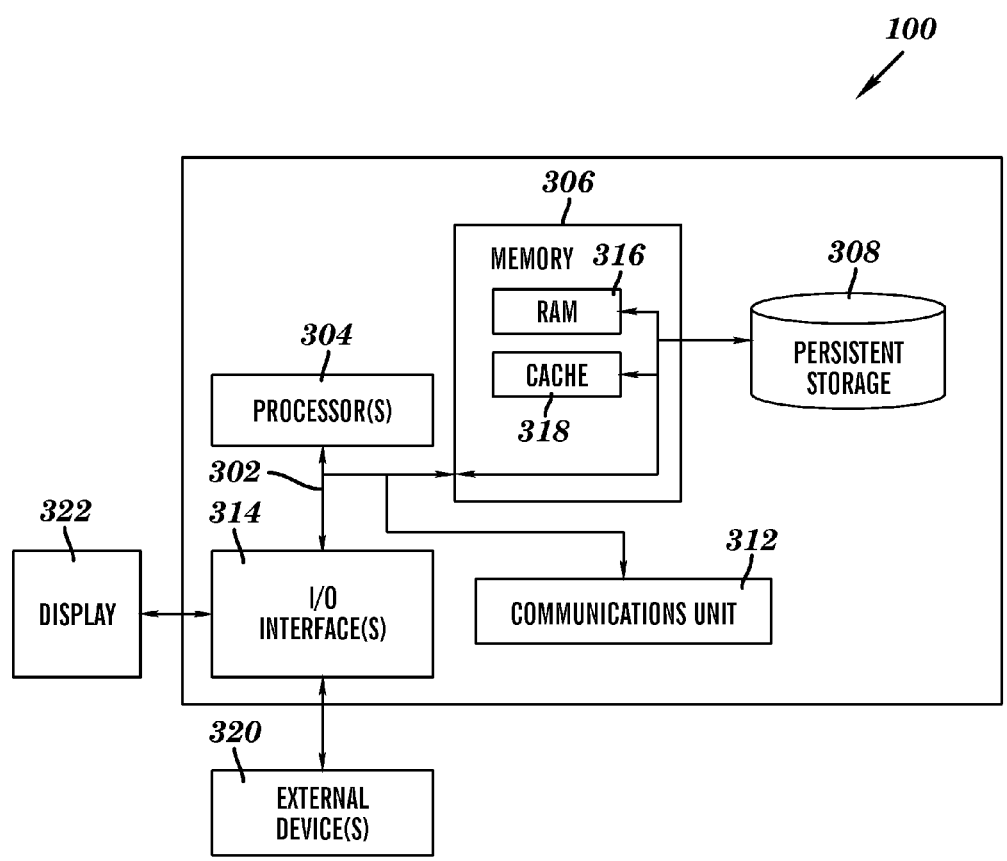
FIG. 3 is a block diagram depicting the hardware components of the incentive determination system of FIG. 1, in accordance with an embodiment of the invention.

FIG. 3 depicts a block diagram of components of computing device 110 and social media server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 and social media server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs incentive program 112 and user interface 114 in computing device 110; and social media site 142 in social media server 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs incentive program 112 and user interface 114 in computing device 110; and social media site 142 in social media server 140, may be downloaded to persistent storage 308 through communications unit 312.

I/O interface(s) 314 allows for input and output of data with other devices that may be connected to computing device 110 and social media server 140. For example, I/O interface 314 may provide a connection to external devices 320 such as, a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., the incentive program 112 and user interface 114 in computing device 110; and social media site 142 in social media server 140 can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge devices. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C–+ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or device. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a payment for one or more questions comprising:

receiving one or more questions;

determining at least one of topics associated with the received one or more questions by utilizing natural language processing;

determining at least one of an urgency factor, an importance factor, and a difficulty level associated with the received one or more questions, wherein the difficulty level is determined by comparing the at least one of topics associated with the one or more questions to previously received questions and assigning the difficulty of the previously received questions to the received one or more questions;

determining at least one of an availability factor of at least one of experts, a skill factor of the at least one of the experts, and a quality level associated with the received one or more questions, wherein the availability factor is determined by a number of previously received answers to previously received questions by the at least one of the experts, wherein the skill factor is determined by analyzing a profile of the at least one of the experts, and wherein the quality level is determined by a rating of the at least one of the experts to the previously received answers; and determining the payment based on adding up the determined at least one of the urgency factor multiplied by a weight associated with the urgency factor, the importance factor multiplied by a weight associated with the importance factor, the difficulty level associated with the received the one or more questions multiplied by a weight associated with the difficulty level, the determined at least one of the availability factor multiplied by a weight associated with the availability factor, the skill factor multiplied by a weight associated with the skill factor, and the quality level associated with the received one or more questions multiplied by a weight associated with the quality level.

2. The method of claim 1, wherein the difficulty level is further determined based on at least one of one or more topics present within the one or more questions and a number of nouns present within the one or more questions.

3. The method of claim 1, wherein the availability level is further determined based on at least one of an activity level of an expert, a login frequency associated with an expert, one or more previous questions asked to an expert, and a login schedule of an expert.

4. The method of claim 1, further comprising the computing device determining a recency factor associated with the one or more questions.

5. The method of claim 4, wherein the payment is further based on the determined recency factor associated with the one or more questions.

6. The method of claim 1, wherein the skill factor is further determined for a group of available experts.

7. The method of claim 1, wherein a quality level is further determined based on a rating associated with one or more answers submitted for one or more substantially similar questions.

* * * * *